July 5, 1938.  C. C. LOOMIS  2,122,984

HAND TRAP

Filed July 6, 1934

INVENTOR.
CRAWFORD C LOOMIS
BY
ATTORNEY

Patented July 5, 1938

2,122,984

UNITED STATES PATENT OFFICE 2,122,984

HAND TRAP

Crawford C. Loomis, Ilion, N. Y., assignor to Remington Arms Company, Inc., a corporation of Delaware Application July 6, 1934, Serial No. 733,951

5 Claims. (Cl. 124—5)

This invention relates to hand target throwers ordinarily called "hand traps", and contemplates a novel and convenient application of a throwing spring to a trap or target thrower adapted to be held in the hand.

In one aspect the invention contemplates such an arrangement of the throwing spring with respect to the target carrier as will obviate the necessity of any latch device for holding the throwing spring cocked.

Figures 1, 2, 3:
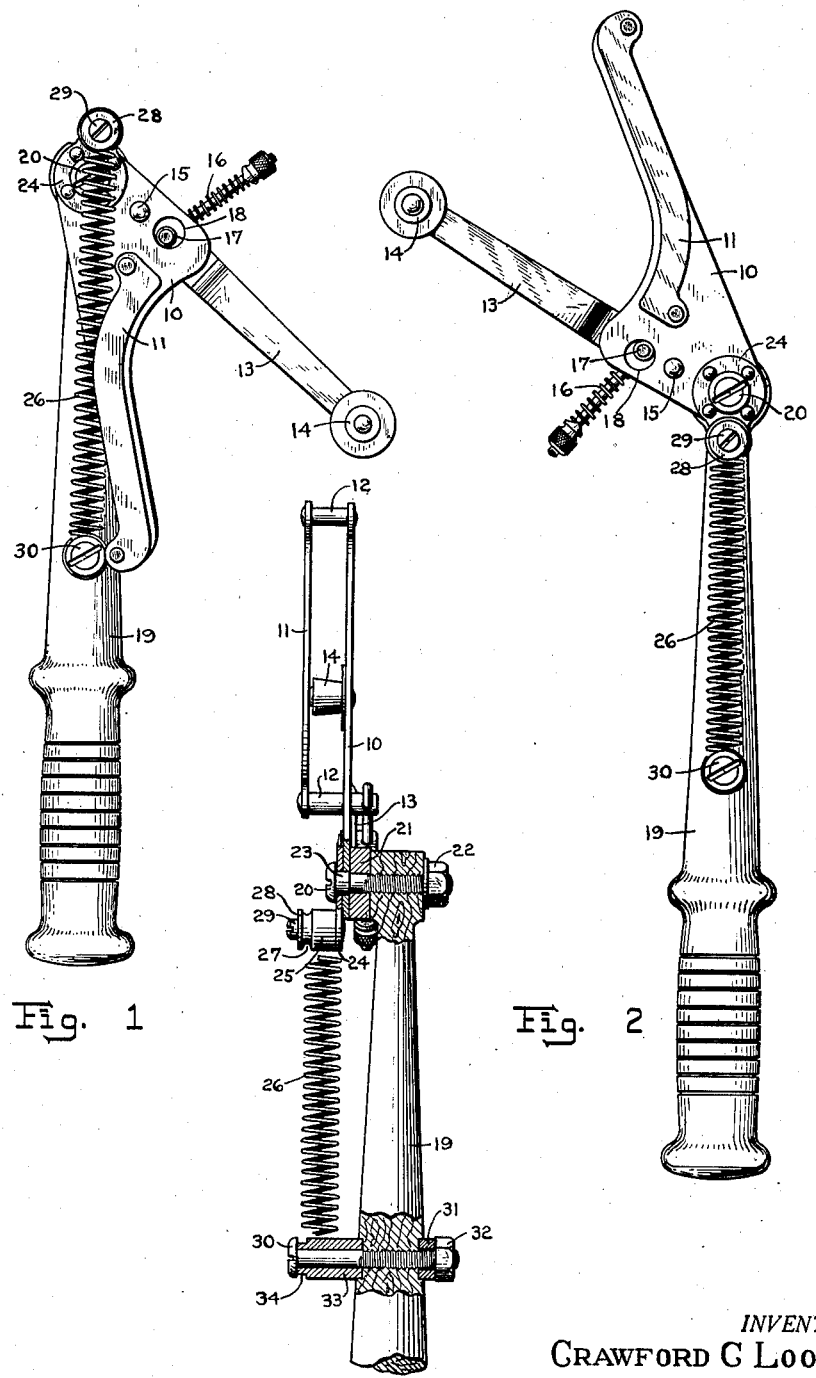
Fig. 1 is a plan view of the trap with the throwing spring cocked and the carrier in position to project a target held thereon when the device is given the usual throwing motion.
Fig. 2 is a plan view of the device after the discharge of a target.
Fig. 3 is a side elevation, parts of which have been sectioned to show the construction of pivots and spring anchors.

The trap comprises a target carrier of conventional construction, said carrier comprising a target supporting plate 10 and a guide rail 11 spaced from and joined to said plate 10 by posts 12. To the plate 10 is pivoted an arm 13 which carries at its free end a suitable friction device such as a rubber stud or roller 14 for imparting a rotary motion to the target. Arm 13 is pivoted to the plate 10 at 15 and is urged toward said plate by spring 16, the movement of arm 13 relative to plate 10 being limited by the engagement of a stud 17 on arm 13 with the margins of an aperture 18 in the plate 10.

The carrier is pivoted to a handle 19 by means of a pivot stud 20 passing through aligned apertures in the carrier and the handle. Preferably the handle aperture is threaded and receives a threaded portion of stud 20. A thick washer 21 may be interposed between the carrier and the handle, and the pivot stud 20, which is in part held in place by suitable means such as a nut 22, may comprise an upper section 23 of enlarged diameter resting upon the washer 21. To the pivot portion of the plate 10 is secured a plate 24 which carries a stud 25 adapted to support one end of a throwing spring 26, the arrangement being such that when the carrier is cocked (Fig. 1) a part of plate 10 passes between the spring 26 and the handle 19. The spring holding means may comprise a groove 27 near the top of the stud, a washer 28 overlying the spring, and a screw 29 received in a threaded aperture in the stud 25.

The opposite end of the throwing spring 26 is held by a spring anchor secured to an intermediate portion of the handle. As illustrated in the drawing, the spring anchor comprises a headed stud 30 passing through and preferably threaded into the handle, and in part held therein by a countersunk washer 31 and a nut 32. The upper portion of said stud is encircled by an elongated bushing 33 having at its upper end a recess 34 adapted to receive a loop on the end of the throwing spring 26, said loop being held in place between the head of the stud 30 and the margin of recess 34.

Referring to Fig. 1, it will be noted that the relation of the carrier pivot 20 and the spring holding stud 25 is such that when the carrier is drawn to the left and the throwing spring extended the spring holding stud 25 just passes a line joining the carrier pivot 20 and the spring anchor stud 30. The spring 26 now tends to draw the carrier further to the left, but the carrier has been thus retracted past "dead center" by so small an amount that upon a short movement to which spring 26 offers but little resistance the carrier advances past "dead center" and is forcefully drawn to or slightly beyond the Fig. 3 position by the throwing spring 26. By so designing the parts as to move the carrier past dead center when it is cocked, the necessity for any form of latching device, hitherto universally used with spring actuated devices of this type, is eliminated. Extraordinary results have been secured with the device, targets being projected therefrom with a velocity and accuracy and steadiness of flight comparable with that of ordinary fixed base targets. The force of projection of the target can be varied substantially by the thrower, since the force exerted by him in the throwing movement is added to the power of spring 26. While springs have hitherto had a limited use in hand traps they have been so arranged as to be tensioned only by the throwing movement, whereas the spring of the present trap is pre-tensioned and released to project the target by a slight and easy movement in no way comparable with the long and difficultly executed movement necessary to project a target a comparatively short distance from other traps.

To avoid encumbering the claims with verbose definitions, the term "hand trap" is here defined as an instrument for the projection of frangible targets which in use is held in the hand of the operator and solely supported by the operator, as distinguished from a trap which is mounted on a fixed base. The term "throwing motion" is defined as a motion normally executed in the projection of a missile under manual power, as distinct from the variety of motions by which an appliance operated by other than hand power may be set in operation. The "cocked position" of the target carrier is defined as the position it occupies when the spring is tensioned and it is ready to project a target thereon when released by the proper movement; and the "released position" of the carrier is defined as its position after the projection of a target and before cocking.

It will be understood that the foregoing description and the drawing are directed specifically to one embodiment of an invention susceptible to many other embodiments and modifications, all falling within the scope of the appended claims, which claims are to be broadly construed.

What is claimed is:

1. A hand trap comprising a handle, a target carrier comprising diverging arms pivoted to said handle and movable from a cocked position in which one of said arms lies along said handle at a small angle thereto to a released position in which said arm extends outwardly from said handle, a throwing spring, and means whereby said throwing spring both holds said carrier in cocked position and moves said carrier from cocked position to released position.

2. A hand trap comprising a handle, a target carrier comprising diverging arms pivoted to said handle and movable from a cocked position in which one of said arms lies along said handle at a small angle thereto to a released position in which said arm extends outwardly from said handle, and a throwing spring attached to and holding said carrier in cocked position by movement past dead center.

3. A hand trap comprising a handle, a target carrier pivoted to said handle and having a cocked position relative thereto, a spring, and supports for said spring on said handle and target carrier respectively, said carrier being adapted to project the target thereon by rotation relative to said handle, such rotation being initiated by a throwing motion of the trap, and said spring serving to hold the carrier in cocked position by movement past dead center and assisting in the rotation of the carrier initiated by said throwing motion.

4. A hand trap comprising a handle, a target carrier pivoted to said handle and adapted to be rotated from a cocked position to a released position and to be restored to cocked position by reverse rotation, a fixed abutment projecting from said handle for determining the cocked position of said carrier, spring supports on said carrier and said handle respectively, and a throwing spring tensioned between said spring supports, the relative positions of said carrier pivot and said spring supports being such that said throwing spring acts to hold said carrier in cocked position in contact with said abutment and to rotate said carrier away from said abutment to released position after such rotary movement of said target carrier has been initiated by a throwing motion of said trap.

5. A hand trap comprising a handle, a pivot held in said handle, a target carrier mounted on said pivot for rotation between a cocked position and a released position, a spring support on said handle, a spring holding means on said target carrier so located as to pass the line of said spring support and said pivot as said target carrier approaches cocked position, and a spring stressed between said spring holding means and said spring support.

CRAWFORD C. LOOMIS.